Jan. 8, 1952 H. W. SMITH ET AL 2,581,610
VISOR APPARATUS
Filed July 17, 1948
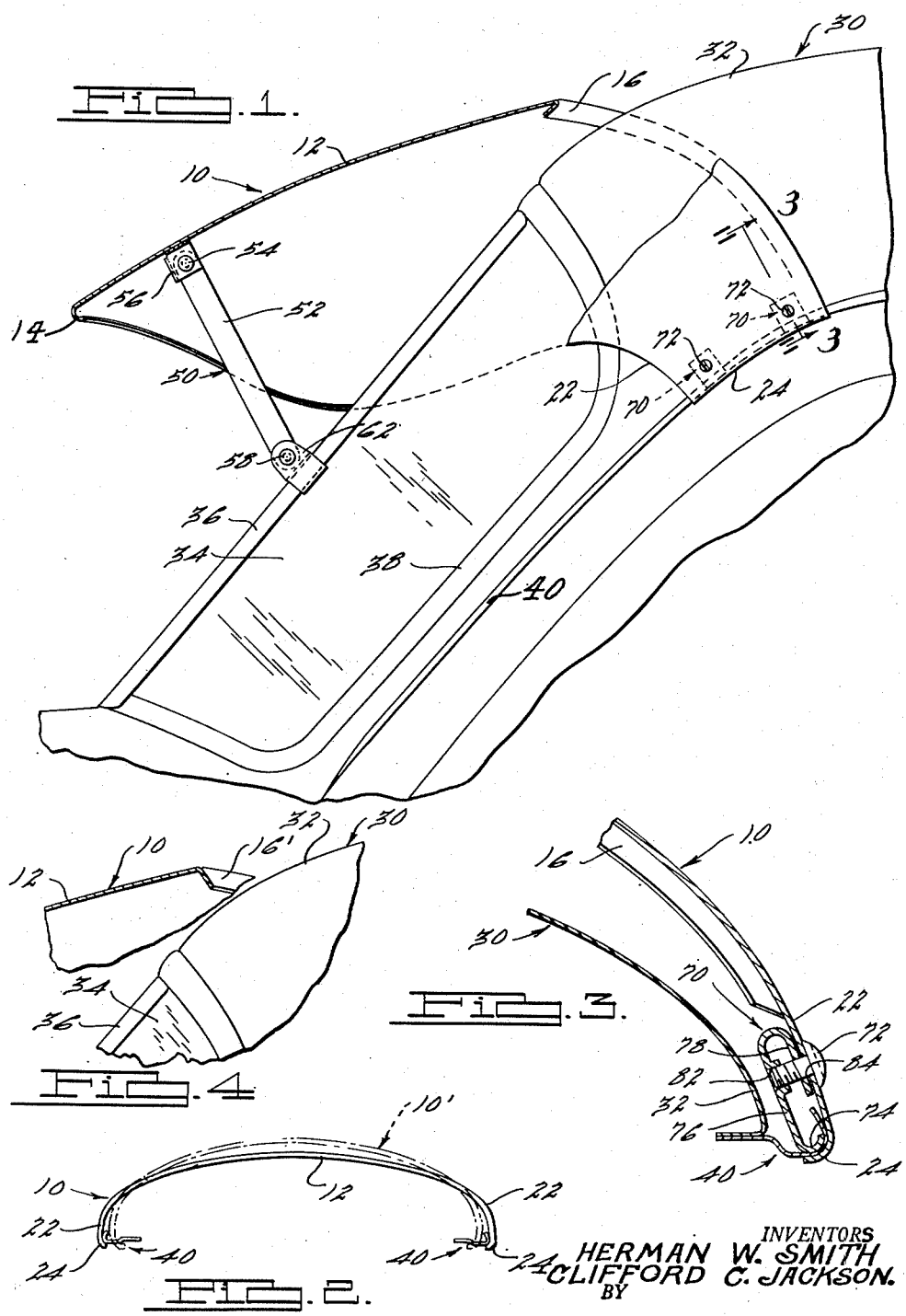
INVENTORS
HERMAN W. SMITH
CLIFFORD C. JACKSON.
BY
Harness and Harris
ATTORNEYS Patented Jan. 8, 1952

2,581,610

UNITED STATES PATENT OFFICE 2,581,610

VISOR APPARATUS

Herman W. Smith, Highland Park, and Clifford C. Jackson, Detroit, Mich., assignors to Chrysler Corporation, Highland Park, Mich., a corporation of Delaware Application July 17, 1948, Serial No. 39,304

4 Claims. (Cl. 296—95)

This invention relates to sun visors for windshields, and more particularly to improved treatment of the profile structure therefor.

It is an object of the present invention to provide a sun visor construction not subject to the howl and wind whistle very often attendant with the usual visors employed for fast moving vehicles.

Another object is the production of a rigid light weight structure not susceptible to such flutter and hum as may be brought about by high vehicle speeds.

Still another object is to produce a simple yet sturdy device which will be economical not only to manufacture but also to install for use.

A further object is to provide a sun visor which may be applied to a streamline styled vehicle yet produce a minimum of wind drag and turbulence over its blended surface contours.

The detailed manner in which the instant invention may be carried out and the further advantages resulting therefrom will become more apparent from a reading of the following description as interpreted in conjunction with the accompanying drawing in which:

Fig. 1 is a side elevation of the visor as installed;

Fig. 2 is a schematic view showing the inherent flexing effect of the visor;

Fig. 3 is a section through the attached end of the visor; and

Fig. 4 is a cross section of the flange as modified.

In the assembly shown in Fig. 1, 10 represents a sun shade or visor which may be mounted on a streamline vehicle 30. Blending with the vehicle roof 32, may be seen a sloping windshield 34 divided by a center strip 36 and bordered by trim molding 38. At the sides of the windshield is a drip molding 40.

The visor is supported at its central or span portion 12 by a center brace 50. This brace includes a body strut 52 pivoted at 54 to its visor bracket 56 which is affixed to the visor by some common means such as by riveting or welding. The lower end of strut 52 is pinned at 58 to its adjustable clamp 62. Clamp 62 hugs around the flanks of center strip 36 in a clam-shell fashion and when tight is immovable. Otherwise, the clamp may be slid along the center strip to afford an adjustment in the spacing of the visor from the windshield.

In addition to the support lent by brace 50, the span 12 is further reinforced by a downturned edge or bead 14 at its lower edge and flange 16 at its upper edge. These reinforcements may be formed of the same piece integrally with the span or they may be manufactured separately and then fabricated to the span by riveting, welding, crimping, soldering, or the like. Terminal portions of the visor are indicated by reference numerals 22 and are seen attached to drip moldings 40 by clamps 70.

In reference to Fig. 2, the gentle curve of the span portion 12 of the visor is seen to be gradually bent into more pronounced curvature as at terminal portion 22 which ends in the tightly curved claws 24. A permanent flex is produced in the visor during its manufacture. Being made of a spring strip of sheet material the visor then has a natural resiliency which causes it to assume in its free spring condition a bowed or arched shape indicated in dotted position 10'. For installation, the visor is extended and sprung over the drip moldings 40 such that the claws or jaws 24 hug in around 40.

The jaws may then be clamped into position as shown in Fig. 3. The clamp or retainer 70 may consist of a C-shaped flat spring strip held to the terminal portion 22 of the visor by a screw 72. The free end 74 fits inside molding 40, while the body portion 76 and pierced end 78 of the strip are apertured at 82 and 84 respectively to receive screw 72. These segments 76 and 78, substantially parallel to each other, are connected by a curved segment which acts more or less as a fulcrum agency. The registered apertures 82 and 84 are spaced from the fulcrum by an amount affording a favorable leverage ratio relative to free end 74.

These C-clamps have been over developed, that is, designed for essentially a straight-on and high clamping factor, in order to provide for extra tenacious holding power. Provision on the visor of reinforcing fins or ribs which project into an air stream tends to prompt additional separating forces as between the passage defining members, which forces may be advantageously overcome by such extra secure clamps. Aperture 82 of the clamp is formed by flanges which are threaded for positive engagement with the screw. Hence as screw 72 is tightened, the end 74 is urged toward jaw 24 to clamp the molding.

As hereinbefore stated in connection with Fig. 1, the span portion 12 is rigidified by the round bead 14 at the lower, or leading edge and flange 16 at the upper or trailing edge. The visor is predeterminedly spaced from the windshield in a manner such that the upper edge is the nearest portion to the vehicle proper. Thus the passage defined by flange 16 and top 32 must accommodate the flow of air normally passing over the windshield when the vehicle is in motion. The rush of such an air column as may be occasioned by high vehicle speeds has the undesirable effect on the usual sun visor of creating a hum, a flutter, or else a whistle or howl at the trailing edge.

Experimentally it has been ascertained that if the trailing edge is turned back on itself enough to form an included acute angle and then the visor is disposed to the vehicle's sloping windshield in a manner such that the angle forming flange is effectually parallel to the vehicle surface standing opposite, air may be conducted past the windshield without occasioning Karman vortices or other swirls and forms of turbulence. The instant invention incorporates that idea in the mode of provision of flange 16 on the trailing edge of the visor. Since an acute angle is included between the flange 16 and visor proper, the extent of the lip may be resolved into a substantial component when projected onto a plane lying normalwise to the visor proper. Hence, sufficient rigidity is imparted to the structure without sacrifice of the non-turbulent and quiet feature of the construction.

In Fig. 4 is shown another embodiment of the invention. Flange 16 may be seen to be disposed to the visor proper so as to include downwardly an obtuse angle of the order of 120°. In effect, the flange is substantially perpendicular to the vehicle surface lying opposite. Experiment has proved this construction to be conducive to non-turbulent air flow and quiet operation. Again, the extent of the flange may be resolved into a sizeable component lying normal to the visor proper, this component serving to furnish ample stiffness to the structure. Yet this flange reintroduces the air column beneath the visor to the column above the visor without producing air burbles and noise creating eddies.

While this invention has been disclosed by specific embodiment representation, it is apparent that various changes in form, number, and arrangement of parts may be made without departure from the spirit and scope thereof.

What is claimed is:

1. A sun visor adapted to be mounted forwardly of and above and to extend in a substantially upwardly converging relationship to a vehicle windshield, the sun visor comprising a sheet-like body portion having the opposite end edge portions thereof adapted for attachment to the vehicle and having a free upper side edge extending between said end edge portions, the sheet-like visor portion being arranged to overhang the windshield in spaced relation, said visor body portion having a flat plate-like stiffening flange extending along the said free upper edge of the visor body portion and projecting downwardly from said body portion at an angle relative to the plane of said visor body portion, said flange providing an air flow control element that guides the air flow relative to the body portion as air is caused to flow across the visor due to forward motion of the vehicle.

2. A sun visor adapted to be mounted forwardly of and above and to extend in a substantially upwardly converging relationship to a vehicle windshield, the sun visor comprising a sheet-like body portion having the opposite end edge portions thereof adapted for attachment to the vehicle and having a free upper side edge extending between said end edge portions, the sheet-like visor portion being arranged to overhang the windshield in spaced relation, said visor body portion having a flat plate-like stiffening flange extending along the said free upper edge of the visor body portion and projecting downwardly from said body portion at an obtuse angle relative to the plane of said visor body portion, said flange providing an air flow control element that guides the air flow relative to the body portion as air is caused to flow across the visor due to forward motion of the vehicle.

3. A sun visor adapted to be mounted forwardly of and above and to extend in a substantially upwardly converging relationship to a vehicle windshield, the sun visor comprising a sheet-like body portion having the opposite end edge portions thereof adapted for attachment to the vehicle and having a free upper side edge extending between said end edge portions, the sheet-like visor portion being arranged to overhang the windshield in spaced relation, said visor body portion having a flat plate-like stiffening flange extending along the said free upper edge of the visor body portion and projecting downwardly from said body portion at an acute angle relative to the plane of said visor body portion, said flange providing an air flow control element that guides the air flow relative to the body portion as air is caused to flow across the visor due to forward motion of the vehicle.

4. The combination with a vehicle having an upwardly and rearwardly sloping windshield and a complemental streamlined body supporting said windshield, of a sun visor spaced forwardly from and above said windshield, the sun visor comprising a sheet-like body portion having the opposite end edge portions thereof attached to the vehicle body and having a free upper side edge extending between said end edge portions, the sheet-like visor body portion being arranged to overhang the windshield in converging, upwardly spaced relation which arrangement divides the airstream that flows over the vehicle windshield on forward motion of the vehicle into two columns, the first of said two columns passing over the exterior face of the visor body portion and the second of said two columns being constrained to passage between the interior face of the visor body portion and the windshield, said visor body portion having a flat plate-like projection along the upper edge that provides a combination stiffening flange and air flow control element that extends along the said free upper edge of the visor body portion and projects from said body portion toward said windshield at an angle to the plane of said visor body portion, said flange cooperating with said streamlined body contour to reintroduce said second column of air into said first column of air with a minimum of turbulence.

HERMAN W. SMITH.
CLIFFORD C. JACKSON.

REFERENCES CITED

The following references are of record in the file of this patent:

UNITED STATES PATENTS

| Number | Name | Date |
|---|---|---|
| 1,394,084 | Gross | Oct. 18, 1921 |
| 2,206,793 | Staubly | July 2, 1940 |
| 2,334,856 | Atkinson | Nov. 23, 1943 |
| 2,447,246 | Groboski et al. | Aug. 17, 1948 |
| 2,507,397 | Bracken | May 9, 1950 |